Figure 1:
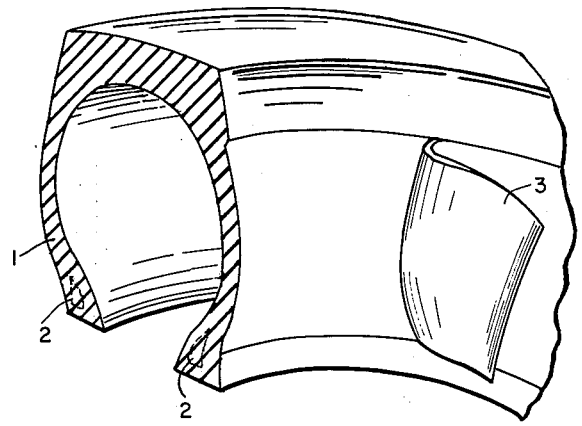

INVENTOR.
HAROLD M. LEEPER
BY Edward L. Doerr
AGENT ized Jan. 15, 1963

3,073,371
LIGHT COLORED TIRE SIDEWALL IMPERVIOUS TO MIGRATORY STAINING MATERIALS
Harold M. Leeper, Dayton, Ohio, assignor to Monsanto Chemical Company, St. Louis, Mo., a corporation of Delaware
Filed Dec. 22, 1958, Ser. No. 782,233
8 Claims. (Cl. 152—330)

This invention relates to a construction of a laminated article having a light-colored layer as one component thereof disposed in contact with a layer containing migratory staining materials. This invention is particularly concerned with a tire casing or similar laminated article including a layer of a composition containing a migratory staining material which normally would migrate into adjacent layers and a light-colored layer disposed in contact therewith in which said light-colored layer is not deleteriously affected by migratory staining materials.

The manufacture of rubber articles having a light-colored portion in combination with a portion containing migratory staining material has heretofore involved certain difficulties. Most vulcanized rubbers such as natural rubber, rubbery copolymers of butadiene and styrene, or of butadiene and acrylonitrile, or of isobutylene-isoprene, or of chloroprene and similar rubbers are pervious to migratory staining materials which are employed as softeners or plasticizers, accelerators and antioxidants in rubber articles. Conventional light-colored rubber compositions of natural or synthetic rubbers are badly discolored by prolonged contact with compositions containing a staining material due to migration of the material into the light-colored layer. The staining is especially pronounced after prolonged exposure of the light-colored portion to sunlight as for example in the use of a white sidewall tire in regular service on an automobile.

Generally white sidewall tires are more costly and less serviceable due to difficulties in overcoming the migration of staining materials, particularly those broadly known as antidegradants. This is due to the fact that the choice of antidegradants that can be used in the tire carcass and under the sidewall is limited to materials which will not stain the sidewall. Many of the cheapest materials, and many of the materials which will impart the best properties to the formulated rubber cannot be used for this reason. For example, antioxidants which do not stain have but slight value in imparting age resisting qualities to a rubber stock, while the best antioxidants stain badly. Excellent antioxidants which migrate and cause staining include 6-ethoxy-1,2-dihydro-2,2,4-trimethylquinoline, marketed as "Santoflex" AW, N-cyclohexyl-N'-phenyl-para-phenylenediamine ("Santoflex" GP), N,N'-diphenyl-para-phenylenediamine, and phenyl-beta-naphthylamine.

In many cases it is neither feasible nor desirable to compound all the layers of a laminated article so that no migratory staining material is included in any of the layers since to do so would necessitate sacrificing certain desirable physical properties imparted to the composition by such staining materials. This policy would preclude the application of reclaimed rubber which already contains a number of staining materials.

It is therefore an object of this invention to provide an article wherein light-colored compositions may be used in contact with compositions containing migratory staining materials in a unitary construction wherein the light-colored composition are not stained by the normally migratory material.

I have discovered that a light-colored layer of a rubbery interpolymer of ethylene and vinyl acetate can be used in contact with a rubbery composition containing migratory staining material and that said ethylene/vinyl acetate interpolymer layer remains impervious to said staining materials. This discovery can be utilized in the manufacture of laminated articles having a light-colored layer so that the light-colored layer retains its original color, free from staining and unsightly discoloration.

Within the scope of my invention, I can employ a light-colored layer in a laminated article wherein the light-colored layer comprises a rubbery interpolymer of ethylene/vinyl acetate blended with suitable pigments, fillers, and antioxidants. The light-colored layer can be advantageously blended with natural rubber, or with synthetic rubbers to prepare a blend that retains resistance to staining by migratory materials.

Snythetic rubber as used herein includes the group of materials, known as elastomers, which have some characteristics of natural rubber, particularly the elastic property of natural rubber. The synthetic rubbers of particular interest in this application are the polymers and copolymers of 1,3-butadiene or of a substituted 1,3-butadiene, e.g., 2-methyl butadiene-1,3. Within the scope of my invention I employ the term rubber to include both natural and synthetic materials having the elastic characteristics of natural rubber. Representative rubbers suitable for blending with ethylene/vinyl acetate interpolymer according to my invention include polyisoprene, styrene/butadiene interpolymer, butadiene/acrylonitrile interpolymer, isobutylene/isoprene interpolymer, neoprene, and silicone rubbers.

In the preparation of blends of ethylene/vinyl acetate interpolymer with a rubber, I prefer to employ at least about 5% of the weight of the total blend of ethylene/vinyl acetate interpolymer to obtain ozone resistance, chemical resistance and age resistance in the resulting polymer. Marked improvements in the properties of a rubber blend can be obtained by incorporating about 20% based on the weight of the blend, of an ethylene/vinyl acetate interpolymer containing at least 40% by weight of vinyl acetate. Such blends exhibit increased tensile strength and improved stress-strain modulus properties. I have found that about 5% ethylene/vinyl acetate interpolymer, based on the weight of the blend, is necessary to impart a resistance to discoloration of said blend by staining migratory antidegradants.

As a further embodiment of my invention I can use blends of ethylene/vinyl acetate interpolymer with natural rubber, and also with synthetic rubbers as described above to form a barrier layer in a laminated article. This barrier layer effectively prevents the migration of staining antidegradants from the dark material containing them into the light-colored layer. When the barrier layer construction is used, the light-colored layer can be formulated from natural rubber or blended formulations if desired.

Of particular significance is my discovery that ethylene/vinyl acetate interpolymer resists migration of staining materials when blended with other synthetic polymers. The polymeric blends can be prepared by milling, on an open, simple rubber mill, varying proportions of ethylene/vinyl acetate interpolymer with rubbery polymers such as synthetic polyisoprene, styrene/butadiene interpolymer, butadiene/acrylonitrile interpolymer, isobutylene/isoprene interpolymer, neoprene, and silicone rubbers.

These polymer blends, prepared by mechanical means from ethylene/vinyl acetate and one or more other rubbery compositions, can be advantageously used as the light-colored constituent of a laminate, in which case suitable fillers and pigments can be added during the blending step before curing the blend. These light-colored layers can be cemented to a rubber containing the staining antidegradants to obtain the desired laminate having the feature of a non-staining light-colored layer, or they can be employed along with an intermediate barrier layer comprising an ethylene/vinyl acetate interpolymer, thus obtaining an even greater resistance to staining and discoloration by migratory materials.

The ethylene/vinyl acetate interpolymers used in the practice of my invention have at least about 40% by weight vinyl acetate, especially of about 40 to 55% by weight vinyl acetate and about 60% to about 45% by weight ethylene. These interpolymers have a number of valuable properties—notably, high resistance to chemical agents and high resistance to aging—which render them useful for inclusion in laminated articles, either alone or in combination blends with other rubbery or resinous materials.

The compositions herein of most interest are those in which the ethylene/vinyl acetate interpolymer has a vinyl acetate content of about 40 to 55% by weight. Such interpolymers are rubbery high molecular weight materials. It is necessary to have at least about 40% by weight of vinyl acetate in order to have such properties as low temperature flexibility, low compression set, and high extensibility and recovery. In terms of number average molecular weights ($M_n$), calculated from osmotic pressure measurements, the ethylene/vinyl acetate interpolymers employed will ordinarily have molecular weights of at least 10,000 to 60,000 or more, although somewhat lower molecular weights, such as those of 5,000 to 10,000 may also be employed; it is also possible to employ such interpolymers of higher molecular weight, up to 100,000 or greater.

The numerically designated molecular weights referred to can also be determined in the conventional manner on the basis of the intrinsic viscosities of the polymer in xylene solution as described in the Journal of Polymer Science, vol. 23, page 887 (1957). In this publication, the intrinsic viscosity is converted to molecular weight by means of the equation $[N]=1.05\times10^{-3}M_w^{0.63}$. By this calculation the ethylene/vinyl acetate interpolymers referred to above would include those having intrinsic viscosities from 0.5 to 5.0. Converted to molecular weight these intrinsic viscosities include broadly copolymers of 18,000 to 700,000 weight average molecular weight.

In general, it can be said that such interpolymers will have number average molecular weights varying from about one-half that of commercial high pressure polyethylene up to about double that of commercial high pressure polyethylene.

The invention in its broadest aspects is not departed from by incorporating into the ethylene/vinyl acetate interpolymer other monomeric materials capable of entering into the polymerization reaction, so long as the desired properties are not deleteriously affected. The amount of comonomer can generally be chosen so as to retain the advantageous results of the copolymerization of particular proportions of vinyl acetate and ethylene, despite the expected effect upon other polymer properties.

It is preferred, however, to employ interpolymers consisting of, or consisting essentially of, ethylene and vinyl acetate copolymerizate.

As a further embodiment of my invention I have found that for certain applications I can apply ethylene/vinyl acetate interpolymers by incorporating this rubbery polymeric substance in paint-like formulations. For example, I can grind, in a conventional paint-mixing mill, the cured polymer, having pigment included therein prior to the curing step, along with an alkyd resin and volatile thinner. The paint formulation thus prepared is particularly effective as a protective coating for equipment exposed to corrosive fumes as in a chemical process plant for example, or for durable exterior coatings where both weathering resistance and pleasing appearance are desired. Ethylene/vinyl acetate formulations can be applied by spray equipment or by conventional manual means.

For certain tire manufacturing operations a light-colored layer can be applied as a coating. Dispersions of pigmented ethylene/vinyl acetate interpolymer can thus be applied directly to the tire casing prior to the final tire molding step. If it is desired to include a barrier layer to further resist migration of staining materials, this layer can also be added to the tire carcass as a dispersion or slurry formulated with a volatile organic solvent.

The light-colored compositions of the present invention are generally utilized in their cured form but both the composition before curing and after curing are considered within the scope of the present invention. The compositions are generally cured by peroxides, or by other organic compounds capable of generating free radicals when heated below 200° C. Thus in addition to the diacyl peroxides, including dicumyl peroxide, benzoyl peroxide and lauroyl peroxide, which are highly effective as curing agents, the following materials may also be used: substances, such as oxygen which react with organic materials to form organic peroxides; dialkyl peroxides such as diethyl peroxide, ditertiary butyl peroxide, diisopropyl peroxide; hydroperoxides such as hydroxymethyl hydroperoxide, tertiary butyl hydroperoxide, ethyl hydroperoxide, etc.; peracids, such as acetoperacid, benzoperacid, succinic monoperacid, phthalic peracid, trimethylacetoperacid; peresters, exemplified by ethyl percamphorate, or esters of perbenzoic acid such as ethyl perbenzoate or tertiary butyl perbenzoate, compounds containing an

grouping, particularly the organic N-chloro derivatives of amines or amides such as chloramine T, dichloramine T, or chloramine B (sodium-N-chlorobenzene-sulfoamide); metal alkyl derivatives, such as lead tetraethyl or lead diethyl dibromide; amine oxides such as triethylamine oxide; hydrazine salts and derivatives such as hydrazine hydrate, hydrazine hydrochloride, hydrazine sebacate or dibenzoyl hydrazine; azino compounds, such as diphenyl ketazine, aldazines, etc. As a rule, it is preferable to select a curing agent that is relatively stable below about 100° C. and substantially non-volatile at temperatures encountered during curing.

It is preferred to employ dicumyl peroxide, in its active form or on a carrier, as the curing agent in the present invention.

The amount of free radical generating compound used as curing agent depends to some extent on the nature of the curing agent, but will ordinarily be within the range of about 0.5 to 2% by weight based on the ethylene/vinyl acetate interpolymer. When dicumyl peroxide is employed as the curing agent, amounts of dicumyl peroxide between about 1 and 3% by weight based on the copolymers are ordinarily employed, and it is preferred to employ amounts between about 1 and 2%. The curing agent is ordinarily incorporated into the ethylene/vinyl acetate interpolymer along with the appropriate pigments on a roll mill, or in a Banbury apparatus or the like, and the composition is then cured at temperatures of about 275 to 350° F.

Figure 2:
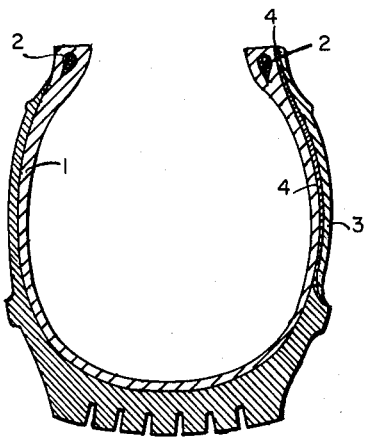

The invention may be embodied in any laminated article. For purposes of illustration the invention is described in detail with reference to a tire casing, FIGURES 1 and 2. FIGURE 1 is a side elevation of a white sidewall tire embodying the features of my invention; FIGURE 2 is a transverse section of the tire.

Referring to FIGURES 1 and 2 of the drawing, the embodiment of my invention shown therein comprises a pneumatic tire having a carcass 1 comprising a plurality of plies of rubberized cord fabric, bead portions 2, white sidewall portion 3, and a tie gum or barrier layer 4 which can be used in one aspect of my invention.

In practicing this invention, the carcass portion 1 of the tire may be of any desired composition including one or more staining materials, reclaimed rubber, etc., in addition to the commonly employed reinforcing materials, vulcanizing agents, accelerators therefor, fillers, etc. The compositions of the rubber used in the tread and bead portion may of course be according to any desired compounding recipe.

A tire embodying this invention is built up from its constituent parts and vulcanized in the usual manner by which the several parts are integrally united into a unitary structure.

Typical examples of compositions which can be used for the sidewall and barrier portions will be described but it will be understood that such recipes are merely illustrative and are not intended to limit the scope of this invention but that the materials specified can be substituted and/or supplemented by various other materials and that all such materials can be employed in various proportions in accordance with usual rubber compounding practices.

EXAMPLE 1

*Non-Staining White Sidewall Composition*

Material: Parts by weight
Ethylene/vinyl acetate interpolymer (56/44 by weight) _____ 100
"Santowhite" Powder [4,4'-butylidene-bis(6-tert. butyl-m-cresol)] _____ 0.1
Titanium dioxide _____ 50
Zinc oxide _____ 10
"Di-Cup 40 C" (40 parts di-cumyl peroxide supported on 60 parts calcium carbonate) _____ 4

Cured for 30 minutes at 160° C.

EXAMPLE 2

*Non-Staining White Sidewall Composition*

Material: Parts by weight
Ethylene/vinyl acetate (56/44) _____ 50
Natural rubber (Page crepe) _____ 50
"Santowhite" powder _____ 1
Stearic acid _____ 1
Titanium dioxide _____ 50
Zinc oxide _____ 10
Sulfur _____ 0.75
"Thiofide" [2,2'-dithiobis(benzothiazole)] ____ 1.25
"Thiurad" (tetramethyl-thiuram-disulfide) ____ 0.2
"Di-Cup 40 C" _____ 4

Cured for 30 minutes at 160° C.

EXAMPLE 3

Vulcanizates compounded for white sidewall application according to the recipes of Examples 1 and 2 were exposed out-of-doors in Southwestern Ohio at 25% extension for 45 days during July and August alongside a cured, filled white sample of natural rubber. At the end of this period the products from Example 1 and from Example 2 showed no ozone cracking; however, the natural rubber sample had completely deteriorated, developing cracks through the material perpendicular to the direction of stress, and showed almost zero tensile strength.

Separate samples of cured compositions from Examples 1 and 2 were exposed out-of-doors in Southwestern Ohio for 75 days during May to August with a southern exposure. The properties of these aged samples were compared with the properties of the same materials, and from the same compounded batches, which had not been aged in sunlight.

| Cured sample | 300% modulus [1] | 500% modulus [1] | Tensile strength (p.s.i.) | Ultimate elongation (percent) |
|---|---|---|---|---|
| Compositions of Example 1: | | | | |
| Aged | 640 | 1,160 | 1,950 | 630 |
| As compounded | 560 | 990 | 1,920 | 675 |
| Compositions of Example 2: | | | | |
| Aged | 605 | 1,410 | 1,785 | 560 |
| As compounded | 575 | 1,375 | 1,850 | 575 |

[1] Determined by ASTM D412–51T3 the tensile stress, measured at the elongation indicated.

Surprisingly, properties were somewhat enhanced by the aging in some instances; no seriously harmful effects were observed in this test with either composition.

EXAMPLE 4

A formulation blended according to the recipe of Example 1 was submitted to a dynamic ozone cracking test. In this test a sample is kept in constant motion, alternately being relaxed and then placed under tension in continuously repeating cycles. The number of hours to the development of the first sign of cracking is one of the criteria of ozone crack resistance. The test was run for 200 consecutive hours. At the end of the test the composition of Example 1 showed no signs of cracking. For purposes of comparison, a natural rubber formulation showed pronounced surface cracking after 24 hours.

EXAMPLE 5

*Observation of Migration of Staining Antioxidants*

A test was devised to measure the discoloration of white-colored laminates caused by migration of staining materials. White formulations of ethylene/vinyl acetate, and of natural rubber were cured in contact with black stock containing a staining antioxidant and the reflectance values of the laminates measured after aging.

FORMULATION A.—WHITE-COLORED ETHYLENE/VINYL ACETATE

Material: Parts by weight
Ethylene/vinyl acetate (54/46) _____ 100
Titanium dioxide _____ 50
"Di-Cup 40 C" _____ 5

FORMULATION B.—WHITE-COLORED NATURAL RUBBER

Material: Parts by weight
Pale crepe natural rubber _____ 100
Titanium dioxide _____ 50
Zinc oxide _____ 25
"Suprex" clay filler _____ 15
Stearic acid _____ 1
Sulfur _____ 3
"Thiofide" _____ 0.6
Diphenyl guanidine _____ 0.15

Black stocks were formulated as follows (parts by weight):

| Material | Formulation C | Formulation D | Formulation E |
|---|---|---|---|
| Formulated black styrene/butadiene rubber (23.5/76.5 copolymer) | 166 | 166 | 166 |
| Sulfur | 1.75 | 1.75 | 1.75 |
| "Santocure" (N-cyclohexyl-2-benzothiazolesulfenamide) | 1.2 | 1.2 | 1.2 |
| "Santoflex" AW (6-ethoxy-1,2-dihydro-2,2,4-trimethylquinoline) | | 1.5 | |
| "Santoflex" GP (N-phenyl-N'-cyclohexyl-p-phenylenediamine) | | | 1.5 |

Each of these compositions was thoroughly mixed on a rubber mill and then removed from the mill as a 0.105" thick layer. Laminates were prepared by curing a white layer and a black layer together in a 0.2 x 2" mold as follows:

| Laminate formulations (white layer + black layer) | Curing conditions |
|---|---|
| (a) A+C (control, contained no staining antidegradant). | 30 min. at 150° C. |
| (b) A+D | Do. |
| (c) A+E | Do. |
| (d) B+C (control, contained no staining antidegradant). | 45 min. at 145° C. |
| (e) B+D | Do. |
| (f) B+E | Do. |

The above six laminates were aged at room temperature and reflectance readings made periodically on the light-colored surface. Within a period of several weeks, staining of the natural rubber was apparent to the naked eye. After a total elapsed time of seven months reflectance readings obtained were as follows:

| Laminate No. (formulations as indicated) | Percent light reflectance |
|---|---|
| (a) A+C (control, no staining antidegradant) | 75.95 |
| (b) A+D | 55.1 |
| (c) A+E | 68.7 |
| (d) B+C (control, no staining antidegradant) | 66.45 |
| (e) B+D | 22.42 |
| (f) B+E | 48.75 |

Note.—(a), (b), and (c) are ethylene/vinyl acetate formulations, (d) (e), and (f) are natural rubber formulations.

For evaluation of the resistance of ethylene/vinyl acetate interpolymer to migration of staining antioxidants compare (b) above with (e), and (c) with (f). The antioxidants used in this test are typical staining chemicals of excellent antioxidant activity that are used in compounding automobile tires.

This test clearly shows the unusual and unexpected properties of ethylene/vinyl acetate white stock in resisting discoloration and staining caused by migratory antidegradants. By the use of my invention white side wall tires can now be constructed incorporating the best chemical antioxidants with the side wall retaining its original level of color. Longer tire life and increased passenger safety are thus assured.

EXAMPLE 6

*Non-Staining White Sidewall Composition*

Material: Parts by weight
Styrene/butadiene rubber (25/75 copolymer) __ 100
Ethylene/vinyl acetate interpolymer (56/44) __ 150
Titanium dioxide _____ 125
Silica (Hi-Sil 233) _____ 25
"Di-Cup 40 C" _____ 10
Cured for 45 minutes at 310° F.

EXAMPLE 7

*Non-Staining White Sidewall Composition*

Material: Parts by weight
Styrene/butadiene rubber (25/75) _____ 100
Ethylene/vinyl acetate interpolymer (56/44) __ 400
Titanium dioxide _____ 250
Silica (Hi-Sil 233) _____ 50
"Di-Cup 40 C" _____ 20
Cured for 45 minutes at 310° F.

EXAMPLE 8

*Properties of Cured Ethylene/Vinyl Acetate Compositions*

| | 100% Modulus | Tensile strength (p.s.i.) | Ultimate elongation (percent) |
|---|---|---|---|
| Product from Ex. 1 | | 1,920 | 675 |
| Product from Ex. 2 | | 1,850 | 575 |
| Product from Ex. 6 | 370 | 1,625 | 240 |
| Product from Ex. 7 | 365 | 1,700 | 470 |

The above data indicate that highly satisfactory properties are attained by blending ethylene/vinyl acetate interpolymer with other rubbery polymeric materials. Rubbery ethylene/vinyl acetate interpolymer used as the sole polymeric constituent of a light-colored composition, or blended with natural rubber of synthetic rubbery polymers, is of value in preparing laminated rubbery articles. The presence of the ethylene/vinyl acetate interpolymer in the composition is necessary to resist and restrain the migration of the staining chemical antidegradants.

In the applications of the light-colored ethylene/vinyl acetate interpolymer compositions to unified laminates, the lamination can be joined by adhesive or by means of a tie gum. For a light-colored tire side wall, resistant to discoloration by the migration of staining chemicals, I can use a light-colored outer layer comprising an ethylene/vinyl acetate interpolymer in combination with an adhesive layer, or joined to the tire carcass by means of a tie gum.

As a further embodiment of my invention I can prevent the migration of staining chemical antidegradants by the use of an intermediate "barrier" layer comprising an ethylene/vinyl acetate interpolymer in combination with the tire carcass and the light colored layer. When the intermediate, or tie gum layer is used, the proportion of ethylene/vinyl acetate interpolymer in the light-colored outer layer can be substantially reduced if desired. However, incorporation of ethylene/vinyl acetate interpolymer in the light-colored layer, not only provides resistance to discoloring migratory staining chemicals, but the aging characteristics and the ozone resistance of this outer layer are appreciably enhanced.

EXAMPLE 9

A representative tie gum, according to my invention, was prepared by milling ethylene/vinyl acetate interpolymer with styrene/butadiene interpolymer. The following components were milled on a rubber roller mill.

Material: Parts by weight
Styrene/butadiene rubber (25/75) _____ 100
Ethylene/vinyl acetate copolymer [1] (56/44) __ 43
Carbon black—"Sterling MT" _____ 71.5
"Di-Cup 40 C" _____ 7.1

[1] Preferred weight range 20 to 60 parts.

The above tie gum formulation was milled to 0.02 inch thickness.

A white ethylene/vinyl acetate interpolymer layer was made up on the rubber mill according to the following recipe.

Material: Parts by weight
Ethylene/vinyl acetate (56/44) _____ 100
Titanium dioxide _____ 50
Silica—"Hi-Sil 233" _____ 10
"Di-Cup 40 C" _____ 4

This white composition was blended and removed from the mill in a sheet of 0.035 inch thickness.

A lamination was prepared by placing the tie gum described above between the ethylene/vinyl acetate white layer and a 0.035 inch thick sheet of standard, carbon black-reinforced styrene/butadiene rubber, and curing the "sandwich" at 302° F. for 45 minutes.

Test samples cut from this laminated sheet were clamped in a flexing device to test the adhesion between the plies under severe conditions. In this test the specimen is alternately stretched to 75% elongation and then completely relaxed to flex the test specimen, at the rate of 430 cycles per minute. When the machine was stopped after 230,000 flexings these samples showed no evidence of ply separation or breaking, and the adhesion of the layers was judged excellent. Some common rubbery laminates will not withstand as many as 20,000 flexings under these conditions without ply separation.

It will be understood that the optimum composition for application as a tie gum or barrier layer to prevent migration of staining antidegradants depends to a certain extent of the compositions of the other portions of the "sandwich." Within the scope of my invention are included formulations or blends of ethylene/vinyl acetate interpolymers with other polymeric materials in which at least 5% of the intermediate layer consists of said ethylene/vinyl acetate interpolymer. Particular advantages are obtained by using from 10% to 30% of the weight of the formulated layer of ethylene/vinyl acetate interpolymer, and compositions containing as high as 80% to 90% ethylene/vinyl acetate interpolymer can be used when barrier layer activity against migratory staining chemicals is desired.

While the invention has been described with particular reference to preferred embodiments thereof, it will be appreciated that variations from the details given herein can be effected without departing from my invention in its broadest aspects.

I claim:

1. A tire casing including a light-colored sidewall portion in contact with a carcass portion containing migratory staining material and a rubber pervious to said staining material, said light-colored sidewall portion comprising a rubbery blend of at least 5% by weight ethylene/vinyl acetate interpolymer of a vinyl acetate content of about 40–55% by weight and having been cured by peroxides or by other organic compounds capable of generating free radicals when heated below 200° C., and a rubber selected from the group consisting of natural rubber, styrene/butadiene copolymer, butadiene/acrylonitrile copolymer, polyisoprene, isobutylene/isoprene copolymer, neoprene, and silicone rubber.

2. A laminated article of manufacture comprising a light-colored layer and a layer containing migratory staining antidegradants in contact therewith, said layer containing migratory staining antidegradants comprising a polymeric rubbery material pervious to said staining antidegradants, said light-colored layer comprising a rubbery interpolymer of ethylene/vinyl acetate of a vinyl acetate content of about 40–55% by weight, said ethylene/vinyl acetate interpolymer having been cured by peroxides or by other organic compounds capable of generating free radicals when heated below 200° C.

3. A tire having a stain-resistant, light-colored sidewall, said sidewall comprising a rubbery ethylene/vinyl acetate interpolymer of a vinyl acetate content of about 40–55% by weight, said ethylene/vinyl acetate interpolymer having been cured by peroxides or by other organic compounds capable of generating free radicals when heated below 200° C.

4. A laminated article of manufacture comprising a light-colored layer and a layer containing migratory staining antidegradants in contact therewith, said layer containing migratory staining antidegradants comprising a polymeric rubbery material pervious to said staining antidegradants, said light-colored layer comprising a blend of natural rubber with at least 5%, of the weight of the blend, of an ethylene/vinyl acetate interpolymer having a vinyl acetate content of from 40% to 55% by weight with the balance being ethylene, said ethylene/vinyl acetate interpolymer having been cured by peroxides or by other organic compounds capable of generating free radicals when heated below 200° C.

5. A laminated article of manufacture comprising
   (1) an inner layer of a polymeric rubbery material pervious to staining migratory antidegradants contained therein,
   (2) a tie gum intermediate layer comprising a blend of styrene/butadiene interpolymer and ethylene/vinyl acetate interpolymer,
   (3) a light-colored outer layer comprising a rubbery ethylene/vinyl acetate interpolymer of from 40% to 55% by weight of vinyl acetate, said interpolymer having been cured by peroxides or by other organic compounds capable of generating free radicals when heated below 200° C.

6. A rubbery composition comprising at least 5% by weight of an ethylene/vinyl acetate interpolymer of from 40% to 55% by weight of vinyl acetate, said interpolymer having been cured by peroxides or by other organic compounds capable of generating free radicals when heated below 200° C., blended with a rubber selected from the group consisting of natural rubber, styrene/butadiene copolymer, butadiene/acrylonitrile copolymer, polyisoprene, isobutylene/isoprene copolymer, neoprene, and silicone rubber, said composition being resistant to the migration of antidegradants.

7. A light-colored, elastic composition resistant to staining by migratory rubber antidegradants comprising at least 5% by weight of an ethylene/vinyl acetate interpolymer containing a ratio of about 40 to 55 parts by weight of vinyl acetate to about 60 to 45 parts by weight of ethylene, said interpolymer having been cured by peroxides or by other organic compounds capable of generating free radicals when heated below 200° C., and a rubber selected from the group consisting of natural rubber, styrene/butadiene copolymer, butadiene/acrylonitrile copolymer, polyisoprene, isobutylene/isoprene copolymer, neoprene, and silicone rubber.

8. A tire having a sidewall portion comprising the composition of claim 7 and a carcass portion comprising a styrene/butadiene copolymer containing staining, migratory antidegradants.

References Cited in the file of this patent

UNITED STATES PATENTS

| | | |
|---|---|---|
| 2,161,934 | Reichard et al. | June 13, 1939 |
| 2,386,347 | Roland | Oct. 9, 1945 |
| 2,388,169 | McAlevy et al. | Oct. 30, 1945 |
| 2,490,536 | Murphy et al. | Dec. 6, 1949 |
| 2,543,229 | Chapman | Feb. 27, 1951 |
| 2,700,997 | Morrissey et al. | Feb. 1, 1955 |
| 2,729,608 | Strain | Jan. 3, 1956 |
| 2,731,060 | Rowe | Jan. 17, 1956 |